Sept. 21, 1971  E. A. MEYER  3,606,721

MOLDING ASSEMBLY AND ADAPTOR AND METHOD

Filed Nov. 5, 1969  2 Sheets-Sheet 1

INVENTOR.
ENGELBERT A. MEYER
BY
Burton & Parker
ATTORNEYS

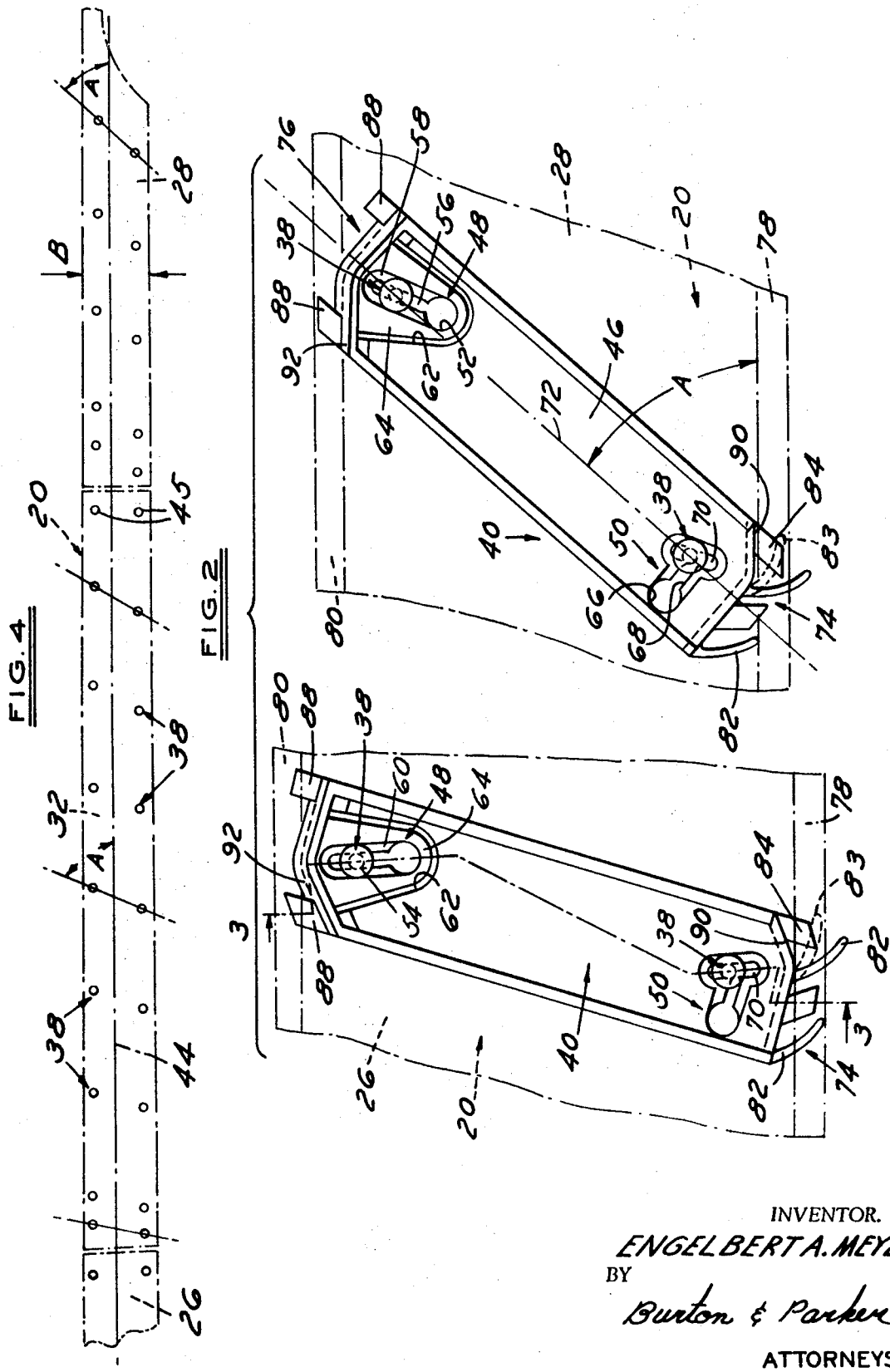

United States Patent Office 3,606,721
Patented Sept. 21, 1971

3,606,721
MOLDING ASSEMBLY AND ADAPTOR AND METHOD
Engelbert A. Meyer, Union Lake, Mich., assignor to Warren Fastener Corporation, Mount Clemens, Mich.
Filed Nov. 5, 1969, Ser. No. 874,133
Int. Cl. B60r 13/04; E04f 19/02
U.S. Cl. 52—718                   5 Claims

ABSTRACT OF THE DISCLOSURE

The molding assembly disclosed herein is adapted to securing tapered moldings to a support. The assembly includes a plurality of studs secured to the support in angularly related, substantially equally spaced pairs, with the angle proportional to the width of the molding. An adaptor is secured to the support by each pair of studs and is positioned at an acute angle by the studs with the greatest angle located at the widest portion of the molding. The disclosed embodiment of the adaptor includes a pair of generally perpendicular key hole slots, one of which is T-shaped, to permit vertical adjustment of the molding after securement. The method of assembly includes securing a plurality of studs to the support in a pattern of pairs, as described hereinabove, securing an adaptor to each pair of studs and receiving the molding over the adaptors and securing the molding in place.

FIELD OF THE INVENTION

This invention relates to the securement of moldings and the like to a support, such as an automotive body panel or appliance cabinet; more particularly, the adaptor and molding assembly of this invention relates to the securement of tapered moldings or trim pieces.

DESCRIPTION OF THE PRIOR ART

Tapered moldings or trim strips are presently secured to automotive bodies, for example, by "cam-type" or spring biased clips, which include a metal cam plate or body portion which is disposed within the molding, and a resilient spring arm which is resiliently biased within the molding to urge the body portion into locking relation between the lateral flanges of the molding. A bolt or the like is thereafter received through the supporting panel, which secures the clip and molding. The molding cannot be adjusted on the supporting panel, and the location of the clips cannot be checked after securement. The prior art includes numerous examples of cam-type clips, including the following U.S. Pats.:

2,531,352    2,796,647
2,695,434    2,961,723
2,784,471    2,979,795

The prior art also includes a number of clips which may also be utilized for tapered moldings, having a pair of spring biased fingers which are received within the lateral flanges of the molding. The body portion of the clip is fixed to the panel by a bolt or the like, and the spring fingers extend laterally to accommodate variations in the width or configuration of the molding. Examples of this type of molding clip include the following U.S. Pats.:

2,677,862    2,716,263
2,713,185    3,280,436

SUMMARY OF THE INVENTION

The molding assembly of this invention includes a support, which may be an automotive body panel or appliance cabinet or the like, a hollow molding overlying the support having at least one portion tapered in width, a plurality of studs secured to the support in a predetermined pattern of pairs and a plurality of adaptors each secured to the support by a pair of studs, securing the longitudinal molding. In the preferred embodiment, each pair of studs is substantially equally spaced and disposed at an acute angle to the longitudinal axis of the molding, with the greatest angle located at the greatest width of the molding. Each adaptor is located and secured at the angle defined by the pair of studs, such that adaptors having the same length may be utilized to secure tapered moldings.

The studs may be welded or otherwise secured to the support, and in the disclosed embodiment the stud is a weld on button, similar to the weld on system disclosed in my U.S. Pats. 3,354,957 and 3,411,262. The button of the weld on system is relatively small when compared to previously employed fasteners in the automotive field. A suitable size button, presently utilized in automotive applications, involves a button which is 0.200 inch in diameter at its head and 0.160 inch in height; the shank diameter of the button is slightly greater than one-half the diameter of the head. Utilization of the weld on fastener system in the automotive field has provided substantial economies and advantages over previous methods. Similar economies and advantages are obtained in other fields, such as appliances, refrigerators, stoves and the like. The adaptor disclosed in my above referenced U.S. Pat. 3,354,597 is secured by a pair of buttons, and the key hole slots are substantially perpendicular to permit securement of the adaptor to the buttons individually, and provide a relatively rigid assembly. This feature has been incorporated in the adaptor of this invention, with certain important improvements.

The preferred embodiment of the adaptor of this invention includes a pair of generally perpendicular key hole slots as described hereinabove, however one of the key hole slots is generally T-shaped, wherein the stud seat portion is generally parallel to the slot and stud seat of the opposed key hole slot. This arrangement permits adjustment of the adaptor, and therefore the molding, parallel to the stud seat of the T-shaped key hole slot after securement of the adaptor and molding to the support. This is an important advantage of the adaptor and molding assembly of this invention over the prior art.

The disclosed embodiment of the adaptor also includes a pair of integral resilient fingers extending from one end of the adaptor adjacent the lateral edge of the molding. The resilient fingers are generally parallel and extend arcuately from the adjacent end of the adaptor at an acute angle. The spring fingers are received within a lateral flange of the molding and secure the molding edge. The spring fingers permit utilization of the adaptor in a tapered molding and compensate for tolerance variations at the lateral edges of the molding. The opposed end of the adaptor receives the opposed lateral edge of the molding thereover, which is snapped in place beneath a downwardly facing surface. The vertical adjustment of the adaptors described hereinabove is aided by defining the key hole slots at an acute angle to the axis of the molding, which is preferably approximately one-half the difference between the angle defined by the adaptor axis at the narrowest and widest positions of the molding. This relationship will provide the greatest vertical adjustment for all of the adaptors in the assembly.

The method of this invention includes securing a plurality of studs to the support in the pattern of pairs, with each pair of studs being equally spaced but defined at an angle to the longitudinal axis of the molding to be secured, as defined hereinabove. The greatest angle is located at the greatest width of the molding. The adaptors are thereafter secured on the studs or buttons by receiving the buttons in the key hole slots defined in the body portion of the adaptor. In the preferred embodiment, a button is first received in one of the key hole slots and the adaptor is thereafter lifted and rotated to receive the second button in the second key hole slot, as defined in my U.S. Pat. 3,354,597 cited hereinabove. Finally, the hollow longitudinal molding is received over the adaptors, with the marginal edges overlying the opposed edges of the molding. The molding is secured to the adaptors by receiving one lateral edge over one edge of the molding and snapping the opposed edge over the opposite edge of the adaptor. The molding may thereafter be adjusted vertically as defined hereinabove.

Although the molding assembly of this invention may be utilized to secure channels or moldings to various supporting structures, including appliances and the like, the instant application will be described in the context of an automotive molding assembly. Other advantages and meritorious features will more fully apepar from the following description of the preferred embodiment, claims, and drawings.

BRIEF DESCRIPTION OF THE DRAWINGS

FIG. 2 is a partial side view of one embodiment of the molding assembly of this invention;

FIG. 4 is a side view of the automotive body panel shown in FIG. 1, including the stud or button layout.

DESCRIPTION OF THE PREFERRED EMBODIMENTS

Figure 1:
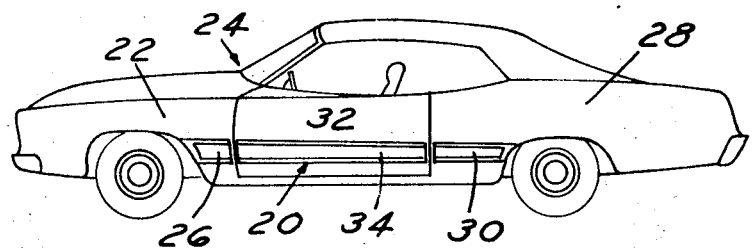
FIG. 1 is a side elevation of an automobile utilizing the molding assembly of this invention.

The molding assembly of this invention is particularly, although not exclusively designed to accommodate tapered moldings, such as the tapered molding shown at 20 in FIG. 1. In this embodiment, the molding gradually tapers from the front fender panel 22 of the automobile 24, as shown by the wide molding section 26, to the rear quarter panel 28 in which the molding section 30 has the narrowest width. The width of the molding is measured perpendicular to the longitudinal axis. The door panel 32 has a tapered molding section 34 co-axially aligned with the adjacent molding sections. It will be understood that the adaptor of this invention may also be utilized in parallel moldings, or moldings having only a tapered or configured portion.

The molding assembly of this invention includes a support or supporting panel 36, a plurality of studs or weld on buttons 38, an adaptor 40 and a molding or trim strip 20. The buttons may be attached to the support in any suitable manner, however the buttons in the preferred embodiment are attached in accordance with the United States Letters Patent of Sweeney No. 3,153,468, which is assigned to the assignee of the instant application. The method described in the Sweeney patent includes welding the button to steel or adhesively securing the button to various materials including steel, thereby eliminating the corrosive problems inherent in previously used techniques requiring a hole through the support. The molding or trim strip 20 may be formed in any desired configuration such as the decorative configuration shown in FIG. 3. It should be noted that the molding in this embodiment is relatively wide, requiring a secure retainment of the molding, especially the molding section 34 on the door panel 32 which is subject to the vibration and shock encountered in opening and closing the door. The molding assembly of this invention provides the secure retention of the molding required, and permits assembly of the studs and molding adaptors prior to receipt of the molding.

The studs or buttons 38 are secured to the panel in a predetermined pattern of pairs, as shown in FIG. 4. Each pair of buttons in this embodiment is equally spaced, and defines a predetermined acute angle A with the longitudinal axis 44 of the molding, proportional to the width B of the molding. The angle is greatest and approaches ninety degrees at the widest molding section 26, and is smallest at the narrow section 30, see also FIG. 1. The angular relation between each pair of buttons in this embodiment is constant because the molding has a constant taper, however it will be understood that the angle A is determined by the width of the molding, and therefore the pattern may not be constant. Further, it may be necessary in certain extreme tapered moldings to utilize more than one adaptor size, in which case only the tapered section utilizing the same adaptors will have equally spaced pairs of buttons. In this embodiment, a special adaptor, not shown, is utilized adjacent the open end of the door panel, and a vertically spaced pair of studs 45 are utilized to secure the adaptor. These studs are not considered part of the invention.

Figure 3:
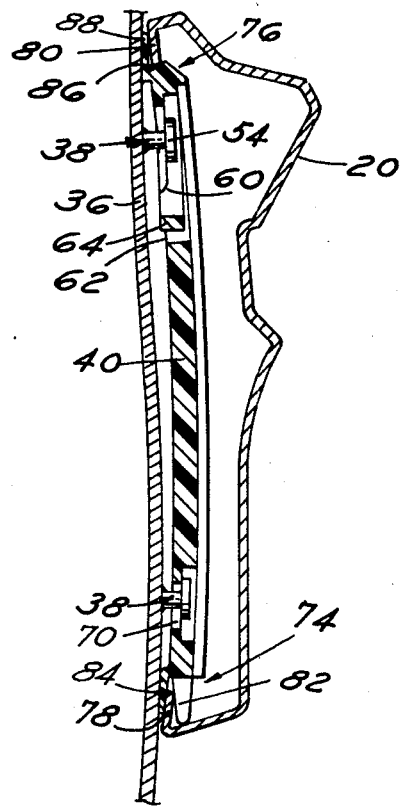
FIG. 3 is a cross sectional view of the embodiment of the molding assembly shown in FIG. 2, in the direction of view arrows 3—3.

Each adaptor 40 in the preferred embodiment of the molding assembly of this invention may be identical, and includes an elongated body portion 46 and a pair of button receiving key hole slots 48 and 50 adjacent the opposed ends. The upper key hole slot 48 includes an enlarged opening 52 which receives the button head 54 therethrough and communicates with the co-axially aligned slot 56 and button seat 58. The slot 56 includes an inclined ramp portion 60 which tensions the adaptor beneath the button head, and the body portion includes a U-shaped slot or cut out 62 which surrounds the key hole slot and forms a resilient tongue 64, as shown in FIG. 3. The upper button of a pair of buttons is first received in the upper key slot 48 and seated in the button seat 58. The adaptor is then rotated and lifted to receive the lower button in the second key hole slot 50, as described more fully in my above referenced U.S. Pat. 3,354,597. The second button is first received in the enlarged opening 66, and the adaptor is thereafter rotated to receive the shank portion of the button in the slot 68, where it is received in the button seat portion 70. It should be noted that the slot 68 is generally perpendicular to the slot and button seat 56 and 58 respectively of the upper key hole slot, permitting receipt of the lower button in the button seat 70 by rotating the adaptor. The button seat 70 is however preferably parallel to the first key hole slot 48, permitting vertical adjustment of the adaptor on the support after securement. The T-shaped key slot 50 thereby provides an important advantage in this embodiment.

It should also be noted that the key hole slot 48 is defined at an acute angle to the longitudinal axis 72 of the adaptor, which in this embodiment generally passes through the buttons 38. This angle is calculated by dividing the angle defined by the axis of the adaptor at the two extreme positions in half, such that the upper key hole slot 48 of all of the adaptors is defined at as close to vertical as possible, providing the greatest vertical adjustment for each adaptor in the assembly.

The opposed ends 74 and 76 of the adaptors 38 receive and secure the inwardly turned flanges 78 and 80 respectively of the marginal edges of the molding 20, as shown in FIGS. 2 and 3. One end 74 of the adaptor includes a pair of integral, generally parallel resilient fingers 82 which are arcuate and defined at an acute angle to the adjacent end of the adaptor body portion 46. A pair of downwardly angled fins 84 are received beneath the molding to prevent metal-to-metal contact. The resilient fingers 82 are first received in the molding flange 78, and the opposed lateral edge of the molding is then received over the end 76 of the adaptor, and snapped beneath the downwardly facing surface 86, securely retaining the molding on the adaptor. The fingers 82 are thereby resiliently distorted within the molding channel, as shown in phantom at 83 in FIG. 2, tensioning the molding against the upper edge 86 and locking the molding on the adaptor. The fingers also compensate for variations in the molding width, which may be relatively large in wide molding stampings. The upper end 76 of the molding also includes a pair of fins 88, spacing the molding from the support, and the opposed edges 90 and 92 of the adaptor are truncated to permit receipt within the molding when the angle A is relatively small, as shown in the right hand adaptor of FIG. 2. The truncated edges are almost parallel to the molding edges at this position.

The method of this invention includes securing the studs 38 to the support, which in the disclosed embodiment is the body panels 22, 28 and 32. The buttons are secured in a predetermined pattern of pairs, as shown in FIG. 4 and described hereinabove. Each pair of studs is defined at an acute angle A to the axis 44 of the molding, proportional to the width B. The adaptors 40 are then secured to each pair of buttons in the manner described hereinabove and defined in my above referenced United States patent. The hollow longitudinal molding is then received over the resilient fingers 82 of the adaptors and the opposed edge 80 is snapped beneath the opposed downwardly facing surface 86 of the molding adaptor. The molding may thereafter be adjusted vertically to align the molding sections 26, 30 and 34. This is generally accomplished by exerting a sharp pressure against either the upper or lower edge of the molding, as required, with a rubber hammer or the like.

While various materials may be utilized for all the elements of the assembly, the automotive industry for example utilizes metal primarily for the body panels and the molding or trim strip. Steel is primarily used for the automotive support, with stainless steel being used for the buttons as well as cold rolled steel. The buttons are preferably stud welded to the prefabricated body panels, before painting, or at least before final finishing, in the predetermined orientation defined hereinabove. After cleaning, coating and polishing, the automotive support is ready to receive the adaptors. The adaptors are preferably made of a non-metallic resilient material to provide the electrolitic corrosion barrier of the fins 84 and 88, described hereinabove, and provide the resiliency required for assembly. A suitable material for the adaptor is a thermoplastic resin, such as fiber filled nylon, polycarbonates, acetal resins, and polypropylene. A suitable material for the disclosed embodiment of the adaptor is sold by the Celanese Corporation under the trade name Celon.

What is claimed is:

1. A molding assembly comprising, in combination: a support; a hollow molding member overlying the support having a longitudinally tapered portion; and means retaining said molding member on said support including a plurality of substantially identical adaptors of resilient materal having end portions engaging the opposite marginal edges of said molding, the adaptors being disposed at various acute angles with respect to the molding member longitudinal axis so as to be receivable within the hollow molding in retaining engagement with said opposite marginal edges thereof aligned spaced apart, a pair of headed studs fixed to the support for each adaptor and said line of alignment disposed at an acute angle corresponding to the angle of their respective adaptor, with each adaptor having a pair of spaced apart slots, each slot having a button seat portion and a keyhole portion for reception over the stud heads said button seat portions being substantially parallel and engaging said studs for permitting adjustment of the molding and adaptors transversely of the molding longitudinal axis.

2. An adaptor of resilient material for securing a longitudinally tapered hollow molding member to a support surface with a pair of spaced buttons attached thereto, said buttons each having an enlarged head portion spaced from said surface, comprising: a body having opposite end portions shaped to retainably engage opposite marginal edges of said molding member, a pair of slots spaced apart along said body, each slot having a button seat portion adapted to be received beneath the head portion of a button and a keyhole portion for reception over the button head, one of said keyhole slot portions being disposed generally perpendicularly to the longitudinal axis of said body, and the button seat portions of said slots having axes substantially parallel to each other and disposed at an acute angle to said body axis.

3. The adaptor defined in claim 2 characterized in that one of said opposite ends of the adaptor body includes at least one resilient finger portion projecting beyond the body adapted to be received within and retain a marginal edge of said molding member.

4. The adaptor defined in claim 3 characterized in that one of said opposite ends of the adaptor body includes a pair of spaced apart resilient finger portions adapted to be deformably received within and retain a marginal edge of said molding member.

5. The adaptor defined is claim 4 characterized in that said pair of resilient finger portions are generally arcuately shaped and parallel to each other.

References Cited
UNITED STATES PATENTS

| | | | |
|---|---|---|---|
| 3,246,440 | 4/1966 | Meyer | 52—718 |
| 3,354,597 | 11/1967 | Meyer | 52—718 |

FRANK L. ABBOTT, Primary Examiner

J. L. RIDGILL, Jr., Assistant Examiner

U.S. Cl. X.R.

248—224

PO-1050
(5/69)

UNITED STATES PATENT OFFICE
CERTIFICATE OF CORRECTION

Patent No. 3,606,721                     Dated September 21, 1971

Inventor(s) E. A. Meyer

It is certified that error appears in the above-identified patent and that said Letters Patent are hereby corrected as shown below:

Column 6, line 2, correct to read:

"marginal edges thereof, a pair of aligned spaced apart"

Signed and sealed this 7th day of March 1972.

(SEAL)
Attest:

EDWARD M. FLETCHER, JR.          ROBERT GOTTSCHALK
Attesting Officer                Commissioner of Patents